United States Patent
Choudhary et al.

(10) Patent No.: US 12,294,755 B2
(45) Date of Patent: May 6, 2025

(54) LIVESTREAM KEY MOMENT IDENTIFICATION

(71) Applicant: ADOBE INC., San Jose, CA (US)

(72) Inventors: Sunav Choudhary, West Bengal (IN); Atanu R. Sinha, Bangalore (IN); Sarthak Chakraborty, Kolkata (IN); Sai Shashank Kalakonda, Telangana (IN); Liza Dahiya, Haryana (IN); Purnima Grover, Haryana (IN); Kartavya Jain, Rajasthan (IN)

(73) Assignee: ADOBE INC., San Jose, CA (US)

( * ) Notice: Subject to any disclaimer, the term of this patent is extended or adjusted under 35 U.S.C. 154(b) by 122 days.

(21) Appl. No.: 18/176,114

(22) Filed: Feb. 28, 2023

(65) Prior Publication Data
US 2024/0292046 A1    Aug. 29, 2024

(51) Int. Cl.
| | |
|---|---|
| *H04N 21/262* | (2011.01) |
| *H04N 21/2187* | (2011.01) |
| *H04N 21/233* | (2011.01) |
| *H04N 21/234* | (2011.01) |
| *H04N 21/25* | (2011.01) |
| *H04N 21/442* | (2011.01) |
| *H04N 21/4788* | (2011.01) |
| *H04N 21/81* | (2011.01) |

(52) U.S. Cl.
CPC ....... *H04N 21/262* (2013.01); *H04N 21/2187* (2013.01); *H04N 21/233* (2013.01); *H04N 21/23418* (2013.01); *H04N 21/251* (2013.01); *H04N 21/44218* (2013.01); *H04N 21/4788* (2013.01); *H04N 21/812* (2013.01)

(58) Field of Classification Search
CPC ............ H04N 21/262; H04N 21/2187; H04N 21/233; H04N 21/23418; H04N 21/251; H04N 21/44218; H04N 21/4788; H04N 21/812
See application file for complete search history.

(56) References Cited

U.S. PATENT DOCUMENTS

| | | | |
|---|---|---|---|
| 12,003,825 B1* | 6/2024 | Nair | H04N 21/4884 |
| 2011/0137723 A1* | 6/2011 | Thorn | G06Q 30/02 |
| | | | 709/217 |
| 2020/0334468 A1* | 10/2020 | Agarwal | G06V 20/47 |
| 2023/0343331 A1* | 10/2023 | Manuvinakurike | G10L 15/063 |

(Continued)

OTHER PUBLICATIONS

Song, et al., "Real-Time Video Highlights for Yahoo Esports", arXiv preprint: arXiv:1611.08780v1 [cs.CV] Nov. 27, 2016, 5 pages.

(Continued)

*Primary Examiner* — Oschta I Montoya
(74) *Attorney, Agent, or Firm* — F. CHAU & ASSOCIATES, LLC

(57) ABSTRACT

Systems and methods for identifying key moments, such as key moments within a livestream, are described. Embodiments of the present disclosure obtain video data and text data. In some cases, the text data is aligned with a timeline of the video data. The system then computes a moment importance score for a time of the video data using a machine learning model based on the video data and the text data, and presents content to a user at the time of the video data based on the moment importance score.

20 Claims, 10 Drawing Sheets

(56) References Cited

U.S. PATENT DOCUMENTS

| | | | |
|---|---|---|---|
| 2024/0040165 A1* | 2/2024 | Jethwa | H04N 21/23418 |
| 2024/0054160 A1* | 2/2024 | Wu | G06Q 30/0201 |

OTHER PUBLICATIONS

Fajtl, et al., "Summarizing Videos with Attention", arXiv preprint: arXiv:1812.01969v2 [cs.CV] Feb. 21, 2019, 16 pages.

Liaw, et al., "Live Stream Highlight Detection Using Chat Messages", 2020 21st IEEE International Conference on Mobile Data Management (MDM), pp. 328-332.

Chouhan, et al., "Sentiment Analysis of Twitch.tv Livestream Messages using Machine Learning Methods", 2021 Fourth International Conference on Electrical, Computer and Communication Technologies, 5 pages.

Song, et al., "Finding epic moments in live content through deep learning on collective decisions", EPJ Data Science, (2021) 10:43, 24 pages.

David, et al., "An Improved audio based key frame detection model for movie summarization", Proceedings of ICAEEC-2019, IIIT Allahabad India, May 31-Jun. 1, 2019, 9 pages.

Harb, et al., "Highlights Detection In Sports Videos Based On Audio Analysis", found on the internet at: https://www.researchgate.net/publication/228361562_Highlights_detection_in_sports_videos_based_on_audio_analysis?enrichId=rgreq-a75d1a28ef73ca87a60e008ef26d6261-XXX&enrichSource=Y2927XJQYWdlOzlyODM2MTU2MjtBUzoyNzg3NTAxMTg4NTg3NjJAMTQ0MzQ3MDYxNTgyNA%3D%3D&el=1_x_2&_esc=publicationCoverPdf, 2003, 7 pages.

Ringer, et al., "Deep Unsupervised Multi-View Detection of Video Game Stream Highlights", arXiv preprint: arXiv:1807.09715v1 [cs.CV] Jul. 25, 2018, 6 pages.

Ringer, et al., "Multimodal Joint Emotion and Game Context Recognition in League of Legends Livestreams", arXiv preprint: arXiv:1905.13694v1 [cs.CV] May 31, 2019, 8 pages.

* cited by examiner

LIVESTREAM KEY MOMENT IDENTIFICATION

BACKGROUND

The following relates generally to multimedia processing, and more specifically to real-time key moment identification. Recently, there has been a sharp rise in livestreamed content. Livestreams have grown in many areas, such as ecommerce, sports, gaming, and solo content creators. Livestreams allow viewers who live across the world to view and participate in events in real time. In many cases, organized livestream events include deals with content providers to periodically present ads for services and products. Content providers are cognizant of the content that surrounds their advertisements. For example, content providers for children's products may not want to purchase media time during the commercials of media directed to adults. Similarly, in the livestream domain, a content provider may not wish to promote merchandise and services during dull or unpleasant moments. Instead, the content provider may wish to present content during a moment with a high engagement from viewers.

SUMMARY

The present disclosure describes systems and methods for identifying key moments in videos. The videos can be from a livestreamed event, or can be prerecorded videos. In some embodiments, the key moments correspond to points in time or time intervals in livestreamed content that the system has determined appropriate times to present additional content, such as an advertisement or a link. Embodiments include a moment identification apparatus configured to process multiple modalities of information from a video, and then process all modalities using a machine learning model to determine a moment importance score. If the moment important score is greater than some threshold, the system then presents the additional content to a user.

A method, apparatus, non-transitory computer readable medium, and system for real-time key moment identification are described. One or more aspects of the method, apparatus, non-transitory computer readable medium, and system include obtaining video data and text data, wherein the text data is aligned with a timeline of the video data; computing a moment importance score for a time of the video data using a machine learning model based on the video data and the text data; and presenting content to a user at the time of the video data based on the moment importance score.

A method, apparatus, non-transitory computer readable medium, and system for real-time key moment identification are described. One or more aspects of the method, apparatus, non-transitory computer readable medium, and system include initializing a machine learning model; obtaining training data including video data, text data, and ground-truth key moment data; combining the video data and text data to obtain multimodal features; and training the machine learning model to identify key moments of the video data based on the multimodal features and the ground-truth key moment data.

An apparatus, system, and method for real-time key moment identification are described. One or more aspects of the apparatus, system, and method include a processor; a memory including instructions executable by the processor to perform operations including: obtaining video data and text data, wherein the text data is aligned with a timeline of the video data; computing a moment importance score for a time of the video data using a machine learning model based on the video data and the text data; and presenting content to a user at the time of the video data based on the moment importance score.

DETAILED DESCRIPTION

Figure 1:
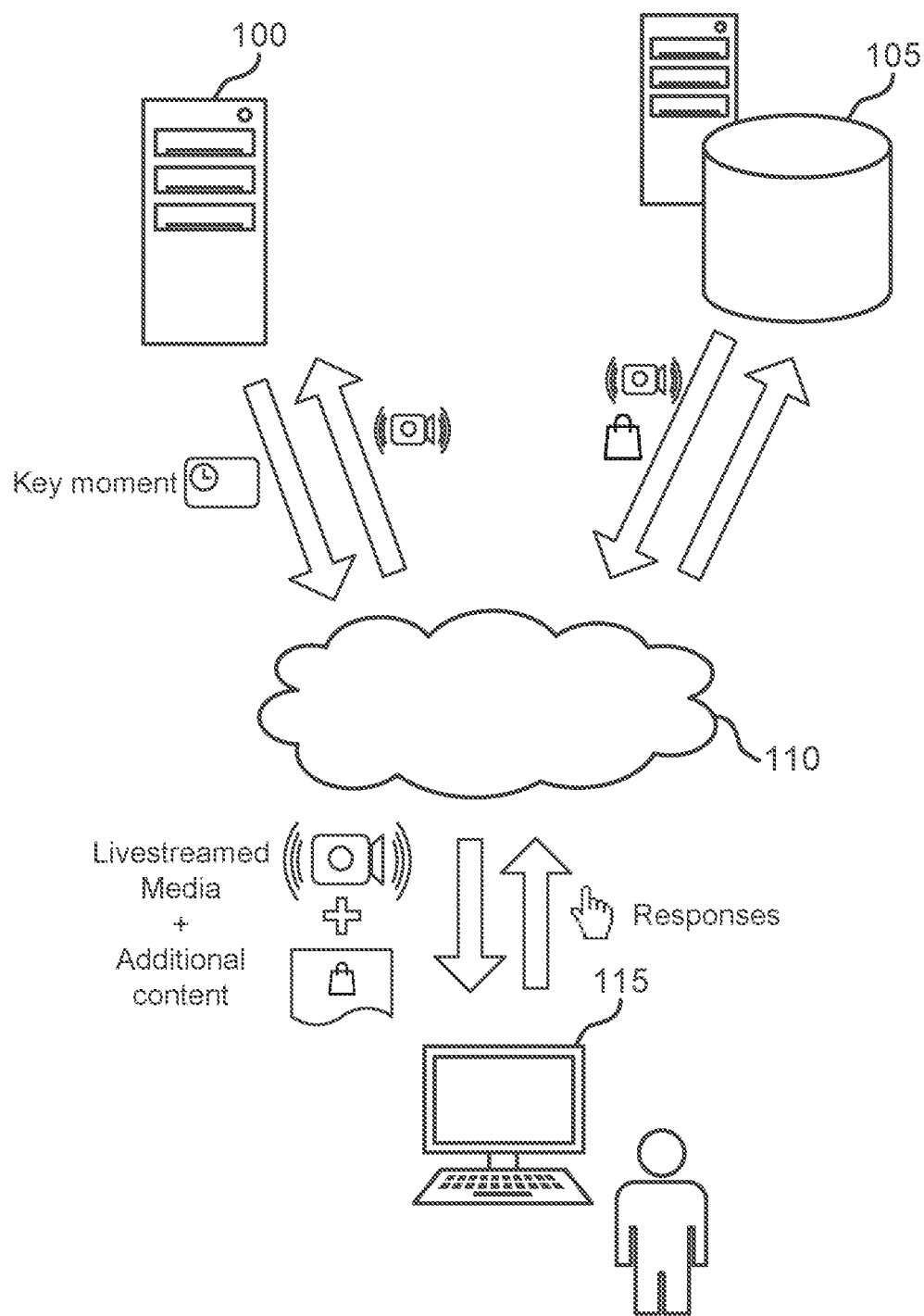
FIG. 1 shows an example of a moment identification system according to aspects of the present disclosure.

Live television and radio broadcasts allowed consumers to listen and view content in real time for decades. Recently, livestreaming has expanded the scope and reach of content through the use of streaming technology. Streaming uses the internet to download audio-visual data in small packets, unpack the data, and present it to a user in real time.

Many livestreams include both audio and visual content. For example, a livestream of a sports event may include a camera feed, sounds from the stadium or venue, and an announcer's voice. Additionally, some livestreams incorporate user interaction via a chat feed in which users can type and post comments in real time.

Livestreams have also seen increased attention from content providers as a possible source of revenue. Content providers may form an agreement with the organizers of the livestream to present an advertisement during a pre-determined segment of the stream. In some cases, content providers form agreements to present the advertisements throughout the stream, and not necessarily according to pre-determined segments. In such cases, the content providers may wish to present content when user engagement is at a maximum. Herein, a moment of high user engagement may be referred to as a "key moment". However, the disclosure is not limited thereto, and in some embodiments, key moments may be determined by target metrics such as a level of significance or highlightable content on the screen, predicted user interest, and the like.

There are some conventional techniques for determining important moments in a video. Some methods for determining key moments include computing an "importance score" for each frame of a video. For example, one technique involves processing a frame of the livestream video using a neural network to predict whether the frame represents an active gameplay scene, and then another neural network to determine if there is a highlightable moment in the scene. However, this approach is applied to individual frames, and does not capture the context of the frames immediately before or after each frame.

Other methods attempt to identify highlight moments in a video by analyzing user sentiment in a chat room of the livestream. These methods utilize various machine learning techniques such as support vector machines, random forest classifiers, and the like to generate sentiment scores based on the chat. While user sentiment provides a useful indicator of user engagement, user sentiment may not correspond with the visual content of the livestream. For example, users may get sidetracked on a topic, and might not fully pay attention to the content of the screen. Therefore, in some cases, extracting sentiment from the chat as a sole modality might not be sufficient to determine key moments.

Embodiments of the present disclosure improve on existing content presentation systems by enabling content providers to identify key moments in live content, and to present additional content at these key moments to achieve higher engagement levels from viewers. Some embodiments use multiple information modalities to identify key moments in a livestream in real time. Some embodiments incorporate a visual modality by computing an importance score for each frame of the video in the context of preceding and proceeding frames. Some embodiments incorporate a text modality by determining sentiment scores from a chat feed of the livestream. Further, some embodiments incorporate audio signals from the stream, and behavioral signals from the stream by tracking a user's selection of presented content.

The architecture and components of an example moment identification system are described with reference to FIGS. 1-5 and 10. Methods and techniques for identifying key moments are described with reference to FIGS. 6-8. An example for training the moment identification system is described with reference to FIG. 9.

Moment Identification System

An apparatus for real-time key moment identification is described. One or more aspects of the apparatus include a processor and a memory including instructions executable by the processor to perform operations including: obtaining video data and text data, wherein the text data is aligned with a timeline of the video data; computing a moment importance score for a time of the video data using a machine learning model based on the video data and the text data; and presenting content to a user at the time of the video data based on the moment importance score.

In some aspects, the machine learning model comprises a recurrent neural network (RNN) configured to combine time series features for the video data and the text data to obtain multimodal features and to compute the moment importance score based on the multimodal features. Some examples of the machine learning model comprise a video feature extraction network and a text encoder. Some examples of the machine learning model comprise an audio component. In some aspects, the machine learning model comprises a user behavior component.

FIG. 1 shows an example of a moment identification system according to aspects of the present disclosure. The example shown includes moment identification apparatus 100, database 105, network 110, and user interface 115.

According to some aspects, moment identification apparatus 100 obtains video data and text data, where the text data is aligned with a timeline of the video data. In some examples, moment identification apparatus 100 obtains audio data corresponding to the video data. In some examples, moment identification apparatus 100 obtains user behavior data corresponding to the video data. Moment identification apparatus 100 can obtain this data from, for example, database 105. Moment identification apparatus 100 then processes the multiple modalities of data to predict key moments. For example, moment identification apparatus 100 may process the modalities of information for a predetermined time window, and then produce a moment importance score than indicates whether a key moment is within the time window.

According to some aspects, moment identification apparatus 100 initializes a machine learning model. In some examples, moment identification apparatus 100 obtains training data including video data, text data, and ground-truth key moment data. For example, an agent may supply moment identification apparatus 100 with the training data during a training phase. The training data may also be provided by database 105. Moment identification apparatus 100 is an example of, or includes aspects of, the corresponding element described with reference to FIG. 2.

One or more components of moment identification apparatus 100 can be implemented on a server. In some cases, one or more components are connected on one or more servers connected by network 110. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

Content, such as videos and livestreams, is stored on database 105. In some cases, database 105 includes data storage, as well as a server to manage disbursement of data and content. A database is an organized collection of data. For example, a database stores data in a specified format known as a schema. A database may be structured as a single database, a distributed database, multiple distributed databases, or an emergency backup database. In some cases, a database controller may manage data storage and processing in database 105. In some cases, a user interacts with the database controller. In other cases, the database controller may operate automatically without user interaction.

In some embodiments, database 105 includes a content distribution network (CDN). A CDN is a distributed network of proxy servers and data centers. The CDN may be configured to provide streaming content to many users at once. In some embodiments, the CDN is configured to store and distribute other data, such as chat logs, downloads, and the like. In at least one embodiment, the CDN includes both database 105 and network 110.

Network 110 facilitates the transfer of information between moment identification apparatus 100, database 105, and user interface 115 (e.g., to a user). Network 110 can be referred to as a "cloud." A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

User interface 115 is configured to present content to a user, and to receive user input. Embodiments of user interface 115 include a display, input means such as a mouse and keyboard or touch screen, speakers, and the like. According to some aspects, user interface 115 presents content to a user at the time of the video data based on the moment importance score. In some examples, user interface 115 presents the content to the user in real time during the livestream. In some aspects, the presenting the content includes: overlaying the content on the video data for a predetermined period of time. Additional detail regarding example components of user interface 115 will be provided with reference to FIG. 10.

Figure 2:
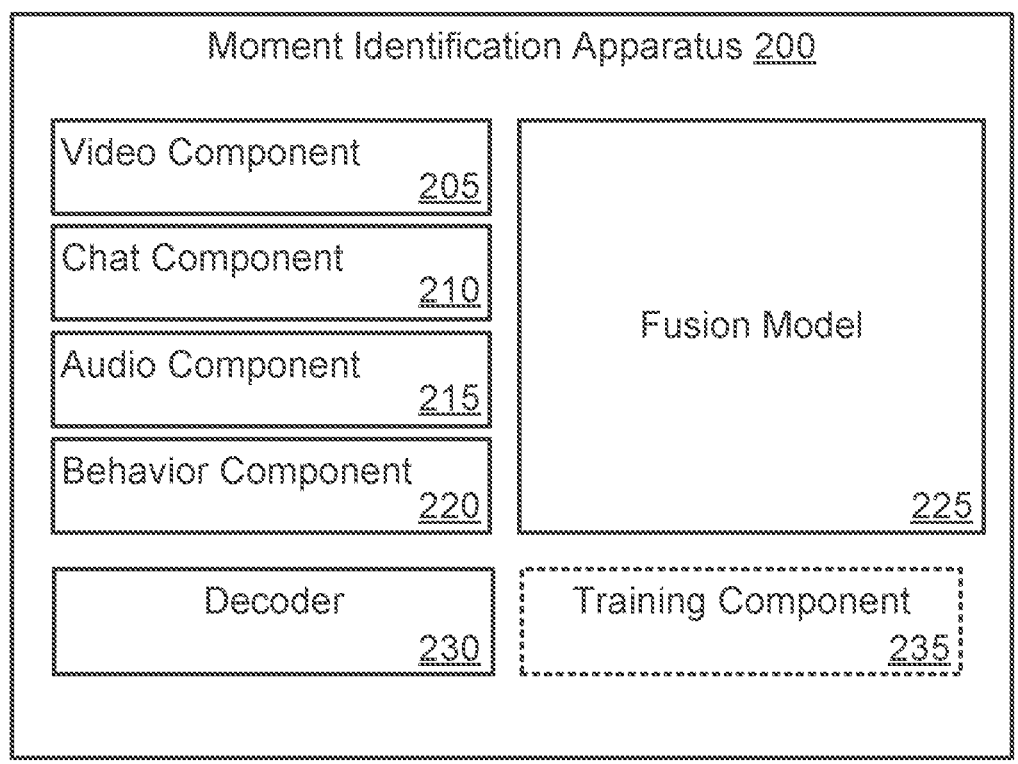
FIG. 2 shows an example of a moment identification apparatus according to aspects of the present disclosure.

FIG. 2 shows an example of a moment identification apparatus 200 according to aspects of the present disclosure. The example shown includes moment identification apparatus 200, video component 205, chat component 210, audio component 215, behavior component 220, fusion model 225, decoder 230, and training component 235. Moment identification apparatus 200 is an example of, or includes aspects of, the corresponding element described with reference to FIG. 1.

Embodiments of moment identification apparatus 200 include several components. The term 'component' is used to partition the functionality enabled by the processors and the executable instructions included in the computing device used to implement moment identification apparatus 200 (such as the computing device described with reference to FIG. 10). The partitions may be implemented physically, such as through the use of separate circuits or processors for each component, or may be implemented logically via the architecture of the code executable by the processors.

Some components of moment identification apparatus 200 include convolutional neural networks (CNNs). For example, embodiments of video component 205 and audio component 215 include CNNs. A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

Media, such as a livestreamed event, can include several modalities of information. Moment identification apparatus 200 is configured to process multiple modalities using video component 205, chat component 210, audio component 215, and behavior component 220. Each component is configured to process a different type of information, and generate scores or metrics about the information that indicate the presence of a key moment in the media at a current time. The scores from each stream of information are passed into fusion model 225, which produces combined features that are passed on to decoder 230. Decoder 230 generates a final prediction—a moment importance score—from the multi-modal features that predicts whether or not a key moment has occurred during the current time, i.e., within a time window. Decoder 230 is an example of, or includes aspects of, the corresponding element described with reference to FIG. 3.

Video component 205 is configured to generate frame scores for a sequence of frames. The frames are extracted from a video, such as a livestreamed video, and the frame scores indicate whether or not the frames belong to a key moment. The frame scores can be binary, e.g. 0 or 1, though the present disclosure is not limited thereto, and a frame score may represent a probability that a corresponding frame belongs to a key moment.

Embodiments of video component 205 generate feature embeddings for frames using an attention block. Video component 205 encodes information about preceding and proceeding frames into an embedding for a given frame via the attention block. In machine learning, an attention mechanism is a method of placing differing levels of importance on different elements of an input. Calculating attention may involve three basic steps. First, a similarity between query and key vectors obtained from the input is computed to generate attention weights. Similarity functions used for this process can include dot product, splice, detector, and the like. Next, a softmax function is used to normalize the attention weights. Finally, the attention weights are weighed together with their corresponding values.

In some cases, the attention block performs self-attention. The term "self-attention" refers to a machine learning model in which representations of the input interact with each other to determine attention weights for the input. Self-attention can be distinguished from other attention models because the attention weights are determined at least in part by the input itself. Additional detail regarding video component 205 will be provided with reference to FIG. 4.

According to some aspects, video component 205 receives the video data from a livestream. In some examples, video component 205 computes frame features for a frame of the video data using a video feature extraction network. In some examples, video component 205 computes a frame score based on the frame features, where the moment importance score is based on the frame score. Video component 205 is an example of, or includes aspects of, the corresponding element described with reference to FIG. 3.

Chat component 210 is configured to generate scores from a chat log. A chat log is a body of data that includes chats between users during the livestream. The chat log may be streamed in real time, similar to the other media content. The scores generated by chat component 210 generally correspond to a level of user engagement within the chat log, and can indicate the presence of a key moment within a time window. Additional detail regarding processing chat information and computing the scores will be described with reference to FIG. 5.

Some components described herein, such as audio component 215 and fusion model 225, include one or more recurrent neural networks (RNNs). An RNN is a class of ANN in which connections between nodes form a directed graph along an ordered (i.e., a temporal) sequence. This enables an RNN to model temporally dynamic behavior such as predicting what element should come next in a sequence. Thus, an RNN is suitable for tasks that involve ordered sequences such as text recognition (where words are ordered in a sentence). The term RNN may include finite impulse recurrent networks (characterized by nodes forming a directed acyclic graph), and infinite impulse recurrent networks (characterized by nodes forming a directed cyclic graph).

Embodiments of audio component 215 and fusion model 225 include one or more LSTM blocks. A long short-term memory (LSTM) is a form of RNN that includes feedback connections. In one example, and LSTM includes a cell, an input gate, an output gate and a forget gate. The cell stores values for a certain amount of time, and the gates dictate the flow of information into and out of the cell. LSTM networks may be used for making predictions based on series data where there can be gaps of unknown size between related information in the series. LSTMs can help mitigate the vanishing gradient (and exploding gradient) problems when training an RNN.

Audio component 215 is configured to generate one or more audio scores from audio data, where the audio scores indicate the presence of a key moment. The audio data can be audio signal data, transcript data, metadata, or others. Embodiments in which the audio data is transcript data from a livestream will be described herein.

Audio component 215 generates word embeddings for words within a transcript. A word embedding is a learned representation for text where words that have the same meaning have a similar representation. GloVe and Word2vec are examples of systems for obtaining a vector representation of words. GloVe is an unsupervised algorithm for training a network using on aggregated global word-word co-occurrence statistics from a corpus. Similarly, a Word2vec model may include a shallow neural network trained to reconstruct the linguistic context of words. GloVe and Word2vec models may take a large corpus of text and produces a vector space as output. In some cases, the vector space may have a large number of dimensions. Each word in the corpus is assigned a vector in the space. Word vectors are positioned in the vector space in a manner such that similar words are located nearby in the vector space. In some cases, an embedding space may include syntactic or context information in additional to semantic information for individual words.

Embodiments of audio component 215 include an encoder-decoder architecture for generating audio scores. In an example, audio component 215 encodes a transcript spanning a window of time into word embeddings. Then, a trained decoding portion decodes the word embeddings to generate an audio score. Additional detail regarding audio component will be provided with reference to FIG. 3. Audio component 215 is an example of, or includes aspects of, the corresponding element described with reference to FIG. 3.

Behavior component 220 measures user responses to presented content. In some cases, behavior component 220 receives information from a user interface as described with reference to FIG. 1. In some examples, behavior component 220 aggregates the number of clicks performed by users within a time window. In some embodiments, behavior component 220 tracks user clicks over time, e.g., across different time windows.

According to some aspects, behavior component 220 identifies a time window based on the time. In some examples, behavior component 220 selects a portion of the user behavior data. In some examples, behavior component 220 computes a user behavior score based on the portion of the user behavior data, where the moment importance score is based on the user behavior score. Behavior component 220 is an example of, or includes aspects of, the corresponding element described with reference to FIG. 3.

Fusion model 225 includes several artificial neural networks (ANNs) to generate multimodal features, or vector encodings, from scores across different modalities. According to some aspects, fusion model 225 combines a frame score from the video data and a text score from the text data to obtain multimodal features, where the moment importance score is computed based on the multimodal features. According to some aspects, fusion model 225 combines the video data and text data to obtain multimodal features. Additional detail regarding fusion model 225 will be described with reference to FIG. 3.

Training component 235 adjusts parameters of video component 205, chat component 210, audio component 215, behavior component 220, fusion model 225, and decoder 230 during one or more training phases. According to some aspects, training component 235 trains the machine learning model to identify key moments of the video data based on the multimodal features and the ground-truth key moment data. In some aspects, the training data includes audio data associated with the video data, where the multimodal features are based on the audio data. In some aspects, the training data includes user behavior data associated with the video data, where the multimodal features are based on the user behavior data. In at least one embodiment, training component 235 is provided in an apparatus different from moment identification apparatus 200. Additional detail regarding training will be provided with reference to FIG. 9.

Figure 3:
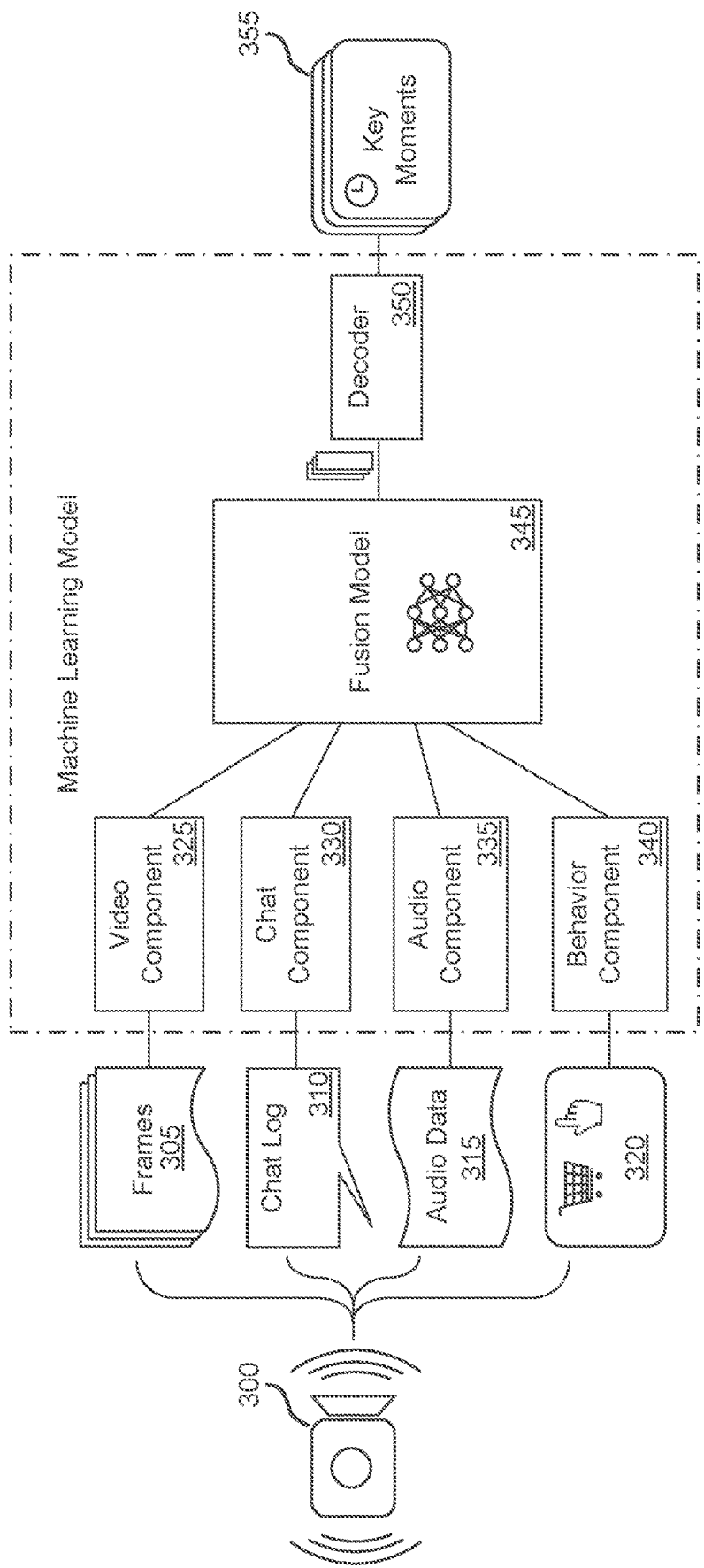
FIG. 3 shows an example of a pipeline for moment identification according to aspects of the present disclosure.

FIG. 3 shows an example of a pipeline for moment identification according to aspects of the present disclosure. The example shown includes media source 300, frames 305, chat log 310, audio data 315, user responses 320, video component 325, chat component 330, audio component 335, behavior component 340, fusion model 345, decoder 350, and key moments 355. Video component 325, chat component 330, audio component 335, behavior component 340, fusion model 345, and decoder 350 each may have trainable parameters, and may be collectively referred to as a machine learning model.

Frames 305 is an example of, or includes aspects of, the corresponding element described with reference to FIG. 4. Chat log 310 is an example of, or includes aspects of, the corresponding element described with reference to FIG. 5. Video component 325, chat component 330, audio component 335, behavior component 340, and decoder 350 are examples of, or include aspects of, the corresponding elements described with reference to FIG. 2. Decoder 350 is an example of, or includes aspects of, the corresponding element described with reference to FIG. 2.

Embodiments of media source 300 include livestreamed content, but are not limited thereto. In some embodiments, media source 300 includes previously streamed content (e.g., multimedia content of events that have already happened), or pre-recorded and edited videos, or the like. A moment identification apparatus, such as the one described with reference to FIGS. 1 and 2, may extract different modalities of information from media source 300. In this example, the information includes frames 305, chat log 310, audio data 315, and user responses 320. While this example includes four modalities, the present disclosure is not necessarily limited thereto, and embodiments may utilize as few as two or more modalities from a media source.

Frames 305 includes frames from video associated with media source 300. In some embodiments, a moment identification apparatus samples frames over a predetermined time window, such as a 30 second window. The frames may be sampled at a lower frame rate than the original source, such as 2 frames per second (FPS). In an example where the time window is 30 seconds, and the frames are sampled at 2 FPS, a "set" of frames includes 60 frames from the time window. However, various sampling rates and time window sizes may be used.

Chat log 310 includes communications from users who participated in or watched the content from media source 300. In some embodiments, chat log 310 includes all chat information within a time window, such as a 30 second window. Consecutive windows may also include an overlap. For example, the overlap can be an amount of time that is less than the current window size. In one example, the chat window is 30 seconds, with a 10 second overlap between consecutive windows. The chat information may include multiple sub-modalities, such as text information and emoji information.

Audio data 315 includes information from audio provided by media source 300. In some embodiments, audio data 315 includes a transcript, an audio signal, an encoding, or a combination thereof. In one example, audio data 315 includes a transcript of the audio within an audio window. The audio window may be, for example, 30 seconds, and consecutive audio windows may overlap. The overlap can be an amount of time that is less than the current window size. In some cases, when audio data 315 includes a transcript, the generation of the transcript can lag behind the content of the video data. Accordingly, some embodiments of audio data 315 are sampled from a window that is offset from a corresponding video data window by a lag time. The lag time can vary according to embodiments, but some cases, the lag time is between 10s and 300s.

User responses 320 include clicks and other indicators of engagement from viewers of media source 300. For example, additional content in the form of hyperlinks may be presented along with the media from media source 300, and user responses 320 may include a user's response to the link, such as a visit, a click, a comment, a form of interaction with a user interface, or other feedback. In some examples, a user's click on the additional content is set as a positive response, while inactivity is set as a negative response. In some cases, live user data is not available for training the machine learning model of the moment identification apparatus, and so the user modality is randomly sampled during training. Additional detail regarding training will be provided with reference to FIG. 9.

Video component 325 receives frames 305 and generates scores for each frame corresponding to a "moment importance". For example, a score for a frame may indicate the probability of that frame's belonging to a key moment in the media stream from media source 300. Additional detail regarding an example of video component 325 will be provided with reference to FIG. 4.

Chat component 330 receives data from chat log 310 such as chat text and chat emojis. Chat component 330 then generates one or more scores based on the information within chat log 310. Additional detail regarding chat component 330 will be provided with reference to FIG. 5.

Some embodiments additionally include audio component 335. In these embodiments, audio component 335 receives audio data 315 and generates an audio score which indicates a probability of the current audio time window's correspondence to a key moment. In some cases, the final audio score is a 0 when audio component 335 predicts there are no frames within the audio time window that correspond to a key moment. In some cases, the final audio score is a 1 when the audio component 335 predicts that at least one frame within the audio time window corresponds to a key moment.

In one example, audio component 335 includes one or more embedding layers, i.e., an audio encoder. The embedding layer produces a vector representation of the transcript within an audio window. For example, one of the embedding layers may embed words from the transcript using Word2Vec, Doc2Vec, GloVe, or the like. Audio component 335 may include a decoder including a deep neural network, e.g., following the one or more embedding layers, which processes the vector representation to produce an audio score as described above.

Some embodiments of the moment identification apparatus additionally include behavior component 340. In these embodiments, behavior component 340 receives user responses 320 and extracts features from data contained therein. In one example, behavior component 340 measures the number of user clicks from every active user within a time window (e.g., a user behavior window). In this example, behavior component 340 then computes an average user click value to represent an aggregate user activity. However, the present disclosure is not limited thereto, and behavior component 340 may pass unprocessed user behavior data from user responses 320 to fusion model 345.

Fusion model 345 receives the various outputs from the above-described components and predicts whether a frame corresponds to a key moment; e.g., whether the frame corresponds to an appropriate time to present additional content, such as a merchandizing offer. Some embodiments of fusion model 345 include one or more LSTM networks.

The following will describe an example architecture of fusion model 345. In an example, fusion model 345 includes one 2-layer LSTM network for each modality of information from media source 300. Each LSTM network includes 128 hidden states. In some cases, fusion model 345 applies batch normalization and dropout operations (e.g., dropout with probability 0.2) before and after the LSTM layers. Each LSTM network produces a feature vector, with features represent to its corresponding input modality. The feature vector may be, e.g., 128-dimensional. The output vectors are concatenated together to form a combined feature vector. The combined feature vector may be, e.g., 512-dimensional. Then, the combined feature vector is passed to decoder 350.

An embodiment of decoder 350 includes a dense layer with 128 neurons and ReLU activations, followed by a 1-dimensional output layer with a sigmoid activation. This example of fusion model 345 includes approximately 1 million trainable parameters. In an example, the final output of fusion model 345 is a determination of whether a currently processed window includes a key moment. The window size may be common to all modality input streams, though the present disclosure is not necessarily limited thereto. For example, the output may indicate whether a given frame, a segment, or other portion of the media includes a key moment.

Figure 4:
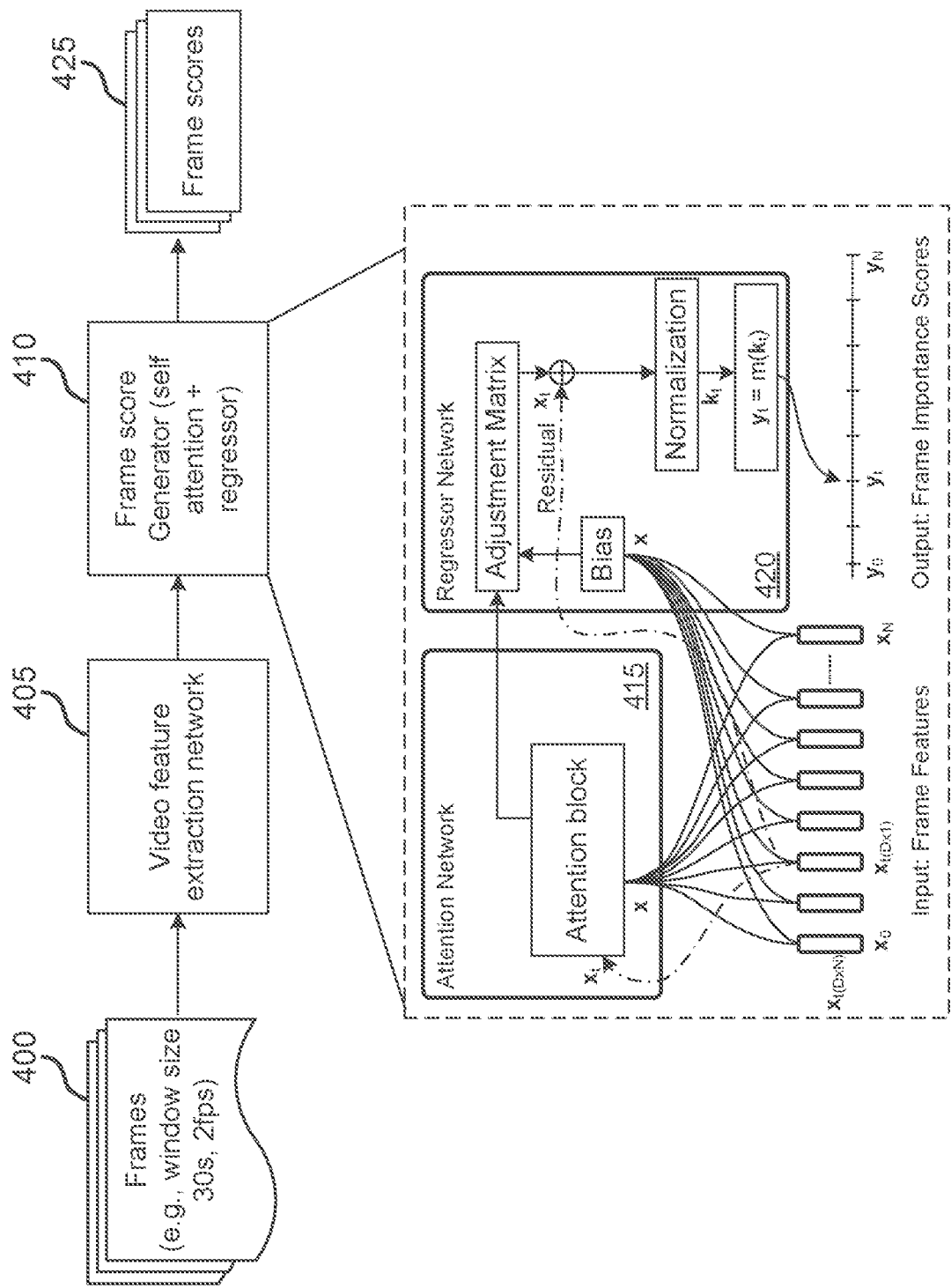
FIG. 4 shows an example of a video component according to aspects of the present disclosure.

FIG. 4 shows an example of a video component according to aspects of the present disclosure. The example shown includes frames 400, video feature extraction network 405, frame score generator 410, and frame scores 425. In one aspect, frame score generator 410 includes attention network 415 and regressor network 420. Frames 400 is an example of, or includes aspects of, the corresponding element described with reference to FIG. 3.

Frames 400 includes frames from video associated with a media source such as a livestreamed video. In embodiments, frames 400 includes video frames within a time window, sampled at a predetermined rate. In one example, the time window is 30 seconds, and the sampling rate is 2 FPS, yielding 60 frames for the video component to process.

Video feature extraction network 405 includes a CNN-based deep ANN configured to generate a feature embedding for each frame of frames 400. Embodiments of video feature extraction network 405 are not necessarily limited to any particular architecture. Some embodiments generate a 1024 length feature embedding for each frame. Some embodiments include a GoogLeNet model which has been pre-trained on ImageNet data.

Frame score generator 410 receives the feature embeddings from video feature extraction network, and generates a frame importance score for each frame. Some embodiments of frame score generator 410 include a self-attention model (e.g., attention network 415) and a regressor (e.g., regressor network 420) configured to compute a frame importance score based on the output of attention network 415. In some embodiments, frame score generator 410 includes a VASNet model which has been pretrained on a dataset including videos with labeled frames corresponding to highlights of the videos.

The attention network 415 receives a sequence of feature vectors corresponding to each frame in frames 400 (e.g., the 60 frames mentioned above), and the attention mechanism incorporates information from all frames in the sequence in the intermediate embeddings. Accordingly, frame score generator 410 considers temporal context when generating scores for each frame of frames 400.

In some cases, the number of frames that does not correspond to a key moment far outweighs the number of frames that do correspond to key moments (e.g., in the training data and in practice). Accordingly, some embodiments of frame score generator 410 additionally up-sample positive frames, down-sample negative frames, or both.

The video component includes video feature extraction network 405 and frame score generator 410, and generates a plurality of frame scores respectively corresponding to input frames. Frame scores 425 are then applied to the fusion model as described with reference to FIG. 3.

Figure 5:
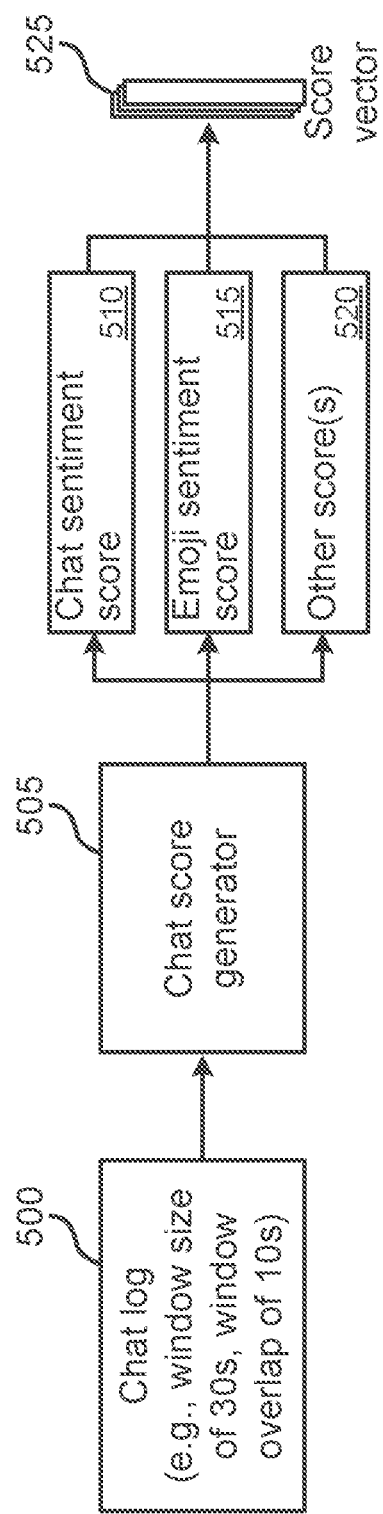
FIG. 5 shows an example of a chat component according to aspects of the present disclosure.

FIG. 5 shows an example of a chat component according to aspects of the present disclosure. The example shown includes chat log 500, chat score generator 505, chat sentiment score 510, emoji sentiment score 515, other score(s), and score vector 525. Chat log 500 is an example of, or includes aspects of, the corresponding element described with reference to FIG. 3.

Chat log 500 includes communications from users who participated in or watched the content from a media source such as a livestream. The communications included in chat log 500 may have additional sub-modalities, such as text, emojis, and others. For example, some livestreaming platforms allow users or content creators to curate sounds, photos, or other media for viewers to send during livestreams.

Chat log 500 includes all of the communications submitted by active users within a time window. In one example, the time window has a size of 30s, and consecutive time windows are overlapped by 10 seconds. In some embodiments, chat log 500 additionally incorporates a lag time which offsets the chat data from the video data. For example, the chat data from chat log 500 may be offset from the video data by a lag time of between 10s and 300s. The present disclosure is not limited thereto, however, and various window, overlap, and lag intervals can be used.

Chat score generator 505 is configured to compute several different scores from the data included in chat log 500. One example of chat score generator 505 is configured to compute five different scores. A first score is a "Density Score" $D_n$, which is the number of messages sent during the time window. A second score is a "Diversity Score" $D_v$, which indicates a diversity level of the chat during the window, and which can be described by Equation 1 below:

$$D_{v} = \sum_{i=1}^{N_T} -P(T=i)\log[p(T=i)] \qquad (1)$$

where T is a unique token in the chat, $N_T$ is the number of unique tokens in the window, and P(T) is the proportion of times the token occurs. A third score is a "User Score" $\mu$, which is the number of distinct users seen within the window interval.

In an example, fourth and fifth scores correspond to sentiment scores, e.g. chat sentiment score 510 and emoji sentiment score 515. Various techniques may be employed to compute text-based sentiment scores, such as machine learning based models and rule based models. In at least one embodiment, VADER, a rule-based and lexicon-based sentiment analysis tool, is used to generate sentiment scores for each message included in chat log 500. In an embodiment, chat sentiment score 510 may be determined according to Equation 2:

$$S_c = \frac{1}{M_{text}} \sum_{i=1}^{M_{text}} f_1(i) \qquad (2)$$

where M text is the number of text messages in the window, and f is the function that computes the text-based sentiment score for i-th text message using one of the tools mentioned above.

Some examples of chat log 500 additionally include emoji messages. Emojis are small icons that are embedded in text standards such as Unicode that are available for use on many platforms, including SMS, many phone and PC operating systems, and the like. Various tools or techniques can be used to extract a sentiment value for a message that includes emojis. In at least one embodiment, emosent, an emoji sentiment lexicon tool, is used to generate sentiment scores for each emoji message included in chat log 500. In an embodiment, emoji sentiment score 515 may be determined according to Equation 3:

$$S_e = \frac{1}{M_{emoji}} \sum_{i=1}^{M_{emoji}} f_2(i) \qquad (3)$$

where $M_{emoji}$ is the number of emoticons in the window, and $f_2$ is the function that computes the sentiment score for i-th emoji message. In cases where emojis are used that have not been mapped to an emoji-sentiment tool as mentioned above, a cosine similarity for the non-mapped emoji(s) may be computed against the current library to determine the closest emoji, and an associated sentiment score will be extracted therefrom.

Score vector 525 is an intermediate representation that encodes or otherwise includes the "Density Score", "Diversity Score", "User Score", chat sentiment score 510, emoji sentiment score 515 as described above. In some embodiments, score vector 525 is a 5-dimensional vector. Score vector 525 is then applied to the fusion model as described with reference to FIG. 3.

Identifying Key Moments

A method for real-time key moment identification is described. One or more aspects of the method include obtaining video data and text data, wherein the text data is aligned with a timeline of the video data; computing a moment importance score for a time of the video data using a machine learning model based on the video data and the text data; and presenting content to a user at the time of the video data based on the moment importance score.

Some examples of the method, apparatus, non-transitory computer readable medium, and system further include receiving the video data from a livestream. Some examples further include presenting the content to the user in real time during the livestream. In some aspects, the presenting the content comprises overlaying the content on the video data for a predetermined period of time. Some examples of the method, apparatus, non-transitory computer readable medium, and system further include capturing the text data from a chat log associated with the video data.

Some examples of the method, apparatus, non-transitory computer readable medium, and system further include computing frame features for a frame of the video data using a video feature extraction network. Some examples further include computing a frame score based on the frame features, wherein the moment importance score is based on the frame score.

Some examples of the method, apparatus, non-transitory computer readable medium, and system further include identifying a time window based on the time. Some examples further include selecting a portion of the text data based on the time window. Some examples further include computing a text score based on the portion of the text data, wherein the moment importance score is based on the text score. In some aspects, the text score comprises a density score, a diversity score, a user score, a text sentiment score an emoji sentiment score, or any combination thereof. Some examples of the method, apparatus, non-transitory computer readable medium, and system further include combining a frame score from the video data and a text score from the text data to obtain multimodal features, wherein the moment importance score is computed based on the multimodal features.

Some examples of the method, apparatus, non-transitory computer readable medium, and system further include obtaining audio data corresponding to the video data. Some examples further include identifying a time window based on the time. Some examples further include selecting a portion of the audio data. Some examples further include computing an audio score based on the portion of the audio data, wherein the moment importance score is based on the audio score. In some aspects, the audio data comprises a transcript of the video data.

Some examples of the method, apparatus, non-transitory computer readable medium, and system further include obtaining user behavior data corresponding to the video data. Some examples further include identifying a time window based on the time. Some examples further include selecting a portion of the user behavior data. Some examples further include computing a user behavior score based on the portion of the user behavior data, wherein the moment importance score is based on the user behavior score.

Figure 6:
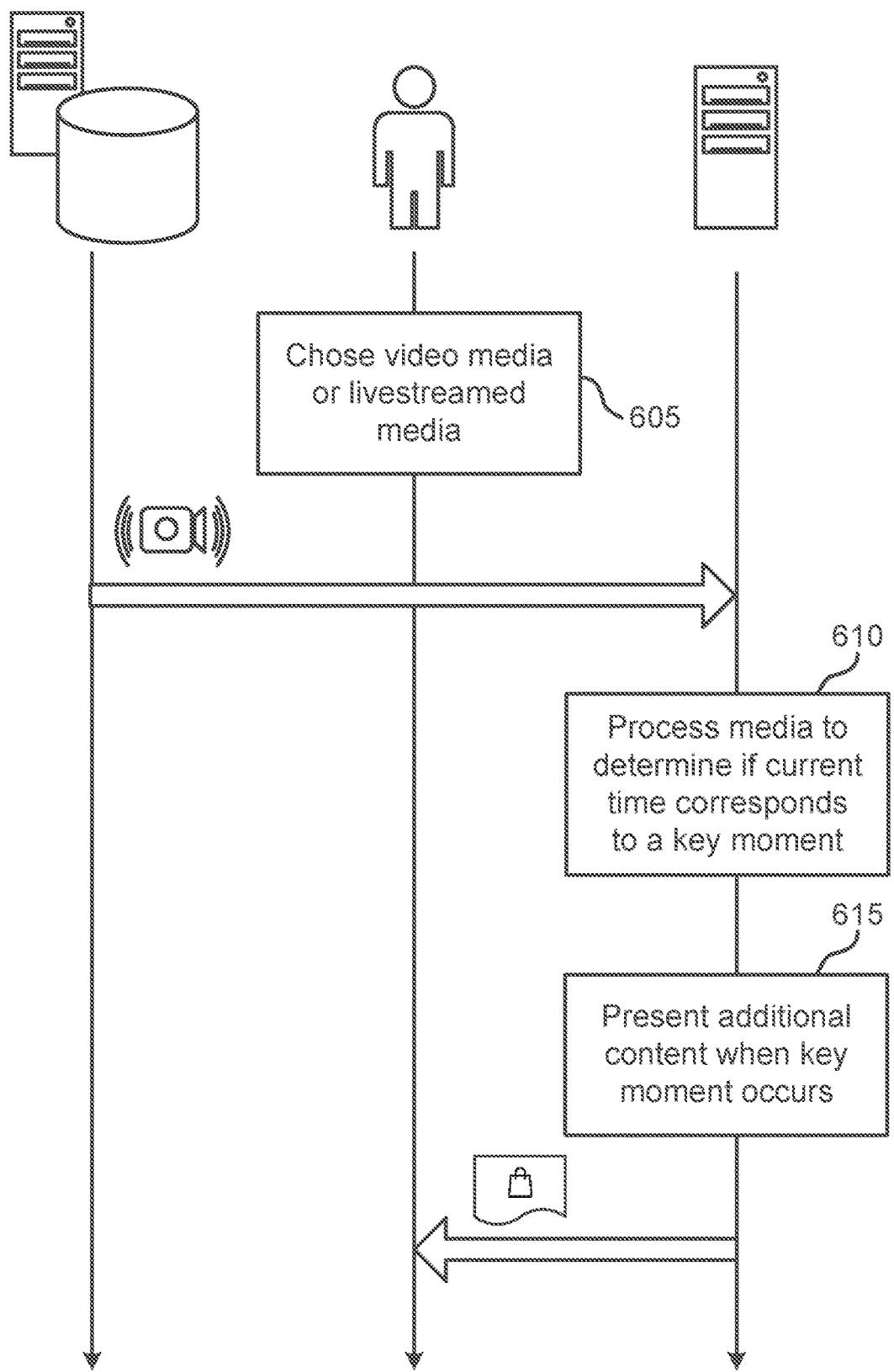
FIG. 6 shows an example of a method for identifying a key moment to present additional content according to aspects of the present disclosure.

FIG. 6 shows an example of a method 600 for identifying a key moment to present additional content according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, a user chooses video media or livestreamed media. For example, a user may visit a livestreaming platform, such as a website, and select livestreamed media via a user interface. A database or CDN such as the ones described with reference to FIG. 1 may supply the livestreamed media.

At operation 610, the system processes the media to determine if current time corresponds to a key moment. For example, the system may process multiple modalities of information from the livestream to generate scores for each modality. Then, a fusion model of the system may combine the scores to generate multimodal features, and a decoder decodes the multimodal features to generate a moment importance score. The moment importance score may be a binary score such as a 0 for if no key moment is occurring in a current time window, or a 1 for if a key moment is occurring. In some embodiments, the moment importance score is a probability that a key moment is occurring in the current time window.

At operation 615, the system presents additional content when key moment occurs. In an example, the system is configured to present content such as hyperlinks, merchandizing offers, images, or videos in addition to the livestream content. The system may present the content to the user through, for example, a user interface.

Figure 7:
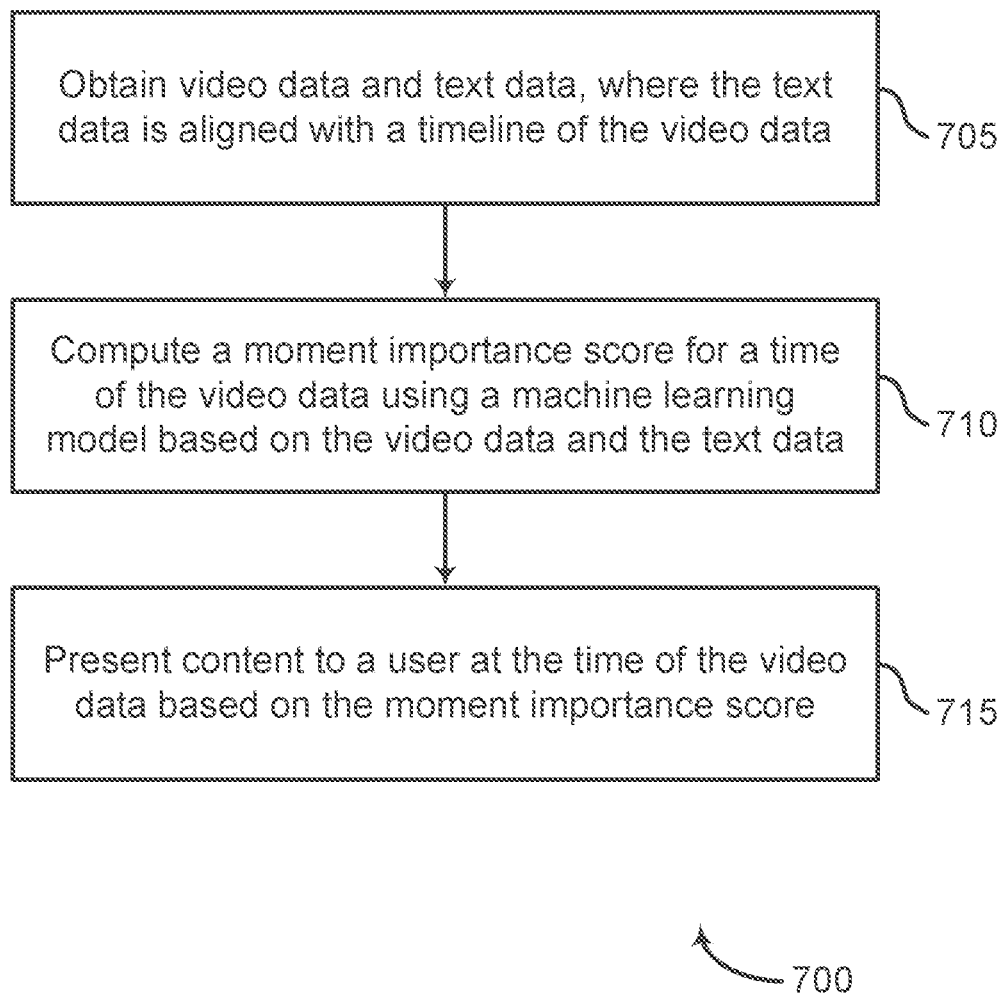
FIG. 7 shows an example of a method for identifying a key moment from multimodal content according to aspects of the present disclosure.

FIG. 7 shows an example of a method 700 for identifying a key moment from multimodal content according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system obtains video data and text data, where the text data is aligned with a timeline of the video data. In some cases, the operations of this step refer to, or may be performed by, a moment identification apparatus as described with reference to FIGS. 1 and 2. The system may obtain multimedia content, such as a livestream, and process the multimedia content into the video and text information streams. In some embodiments, the system obtains video and text streams that are already separated.

At operation 710, the system computes a moment importance score for a time of the video data using a machine learning model based on the video data and the text data. In some cases, the operations of this step refer to, or may be performed by, a machine learning model as described with reference to FIG. 2. In an example, the moment importance score is generated from a decoder of the machine learning model based on multimodal features produced by a fusion model of the machine learning model. Additional detail regarding an example process is provided with reference to FIG. 3.

At operation 715, the system presents additional content to a user at the time of the video data based on the moment importance score. For example, the video data and the text data may be processed during a time window that has not yet been seen by a user; i.e., the user may view a livestream that is delayed by a processing window with respect to the video. Upon determining that the moment importance score for the current window corresponds to a key moment, the system may then present the livestreamed content along with additional content to the user, while processing the next time window. The system may present the content within a user interface as described with reference to FIG. 1. In some cases, the system overlays the content onto video from the video data. In at least one embodiment, the system presents the content in a part of the user interface so as not to obscure the video.

Figure 8:
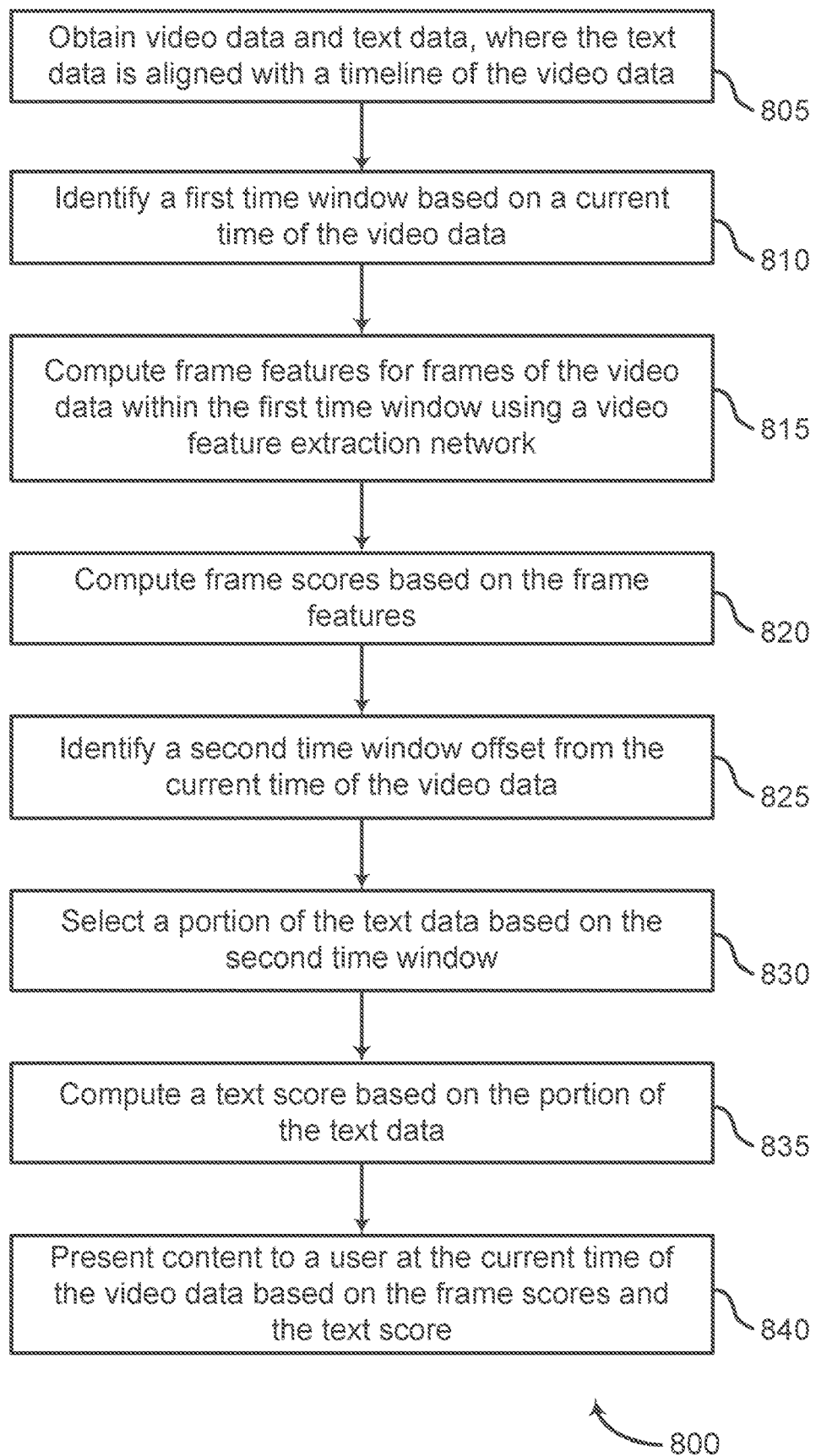
FIG. 8 shows an example of a method for processing multiple modalities according to aspects of the present disclosure.

FIG. 8 shows an example of a method 800 for processing multiple modalities according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system obtains video data and text data, where the text data is aligned with a timeline of the video data. In some cases, the operations of this step refer to, or may be performed by, a moment identification apparatus as described with reference to FIGS. 1 and 2.

At operation 810, the system identifies a first time window based on a current time of the video data. In some cases, the operations of this step refer to, or may be performed by, a user interface as described with reference to FIG. 1. The first time window may be the most recent time window with respect to the video data that is processed by the system.

At operation 815, the system computes frame features for frames of the video data within the first time window using a video feature extraction network. In some cases, the operations of this step refer to, or may be performed by, a chat component as described with reference to FIGS. 2 and 3.

At operation 820, the system computes frame scores based on the frame features. In some cases, the operations of this step refer to, or may be performed by, a chat component as described with reference to FIGS. 2 and 3. Additional detail regarding the computation of frame features, and the generation of frame scores from the frame features, is described with reference to FIG. 4.

At operation 825, the system identifies a second time window based on the current time of the video data, but offset by a predetermined lag interval. In some cases, the operations of this step refer to, or may be performed by, a chat component as described with reference to FIGS. 2 and 3. The second time window may include the lag interval to allow the text data to reflect events that have transpired within the video data.

At operation 830, the system selects a portion of the text data based on the second time window. At operation 835, the system computes a text score based on the portion of the text data. Additional detail regarding the computation of the text score from the text data is provided with reference to FIG. 5.

At operation 840, the system presents content to a user at the time of the video data based on the frame scores and the text score. The system may present the content within a user interface as described with reference to FIG. 1. In some cases, the system overlays the content onto video from the video data. In at least one embodiment, the system presents the content in a part of the user interface so as not to obscure the video.

Training

A method for real-time key moment identification is described. One or more aspects of the method include initializing a machine learning model; obtaining training data including video data, text data, and ground-truth key moment data; combining the video data and text data to obtain multimodal features; and training the machine learning model to identify key moments of the video data based on the multimodal features and the ground-truth key moment data. Some examples of the method, apparatus, non-transitory computer readable medium, and system further include predicting a moment importance score for a time of the video data using the machine learning model based on the multimodal features.

In some aspects, the training data includes audio data associated with the video data, wherein the multimodal features are based on the audio data. In some aspects, the training data includes user behavior data associated with the video data, wherein the multimodal features are based on the user behavior data.

Figure 9:
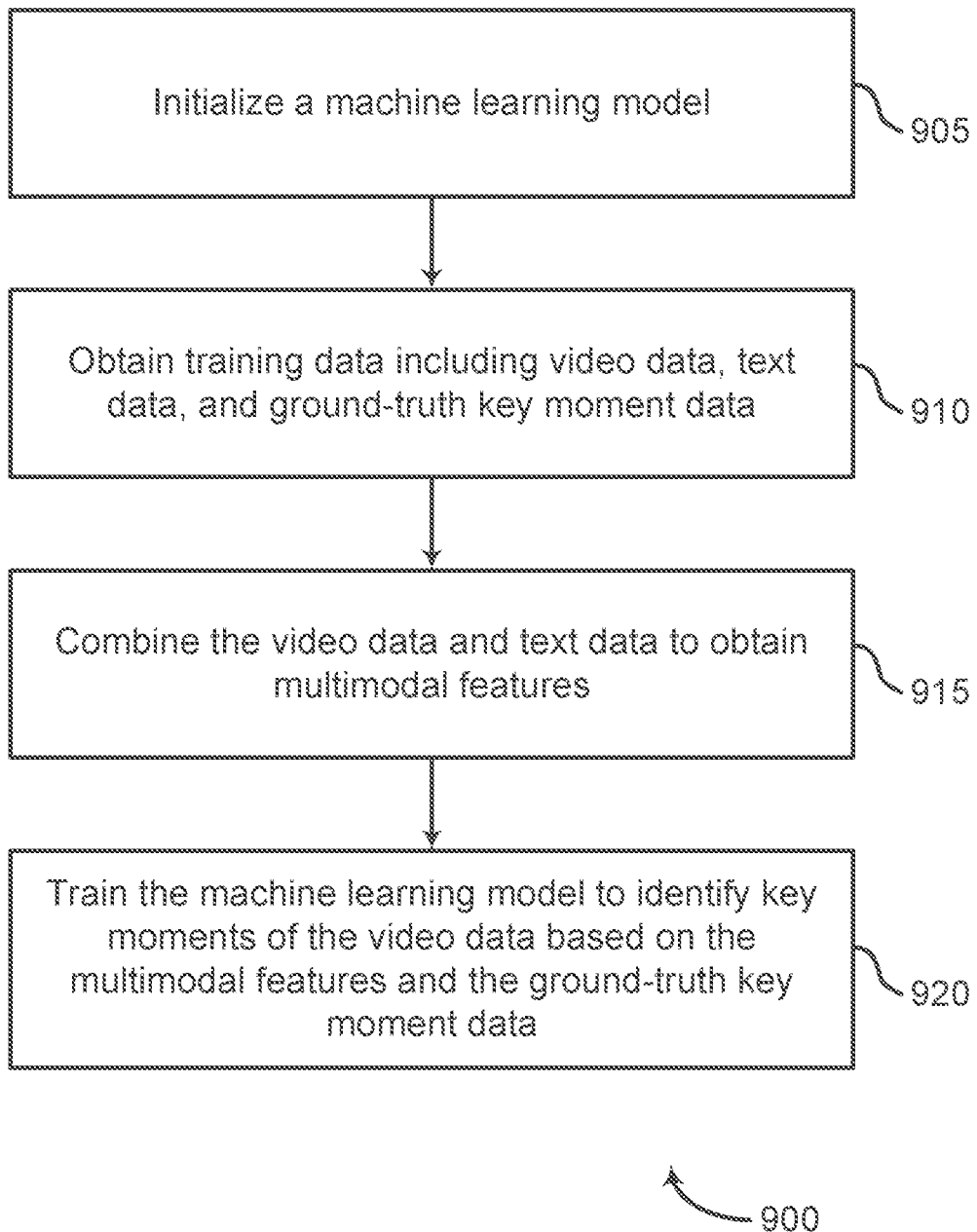
FIG. 9 shows an example of a method for training a machine learning model to identify key moments according to aspects of the present disclosure.

FIG. 9 shows an example of a method 900 for training a machine learning model to identify key moments according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system initializes a machine learning model. In some cases, the operations of this step refer to, or may be performed by, a moment identification apparatus as described with reference to FIGS. 1 and 2. Initializing the machine learning model may include initializing various machine learning blocks, and connecting them according to a predetermined architecture. Machine learning blocks can include attention blocks, LSTM blocks, convolution blocks, etc. Additional machine learning elements can include skip connections, feed forward connections, dropout probabilities, and the like. Example structures of various components within the machine learning model are described with reference to FIGS. 3-5.

According to some aspects, a training component such as the one described with reference to FIG. 2 is used to compare predictions from the moment identification apparatus with training data, and use the comparisons to adjust parameters of a moment identification apparatus.

At operation 910, the system obtains training data including video data, text data, and ground-truth key moment data. In some cases, the operations of this step refer to, or may be performed by, a moment identification apparatus as described with reference to FIGS. 1 and 2. In an example, training data includes labeled video data, which includes ground-truth video frames. The frames may be pre-scored or pre-labeled, for example, assigned either a 0 or a 1. Training frames within the video data are assigned a 0 if they are not present in a ground-truth highlight video, and are assigned a 1 if they are. The highlight video may be manually selected and labeled by a person, and it corresponds to the key moments as described herein.

In some embodiments, the training component adjusts parameters of the video component within the moment identification apparatus during a training phase. For example, the video component may predict a frame score from the training data using the methods described with reference to FIG. 4, and the training component will compare the prediction to the ground-truth score of the frame. Then, the training component will update parameters of the video component, such as the parameters within the attention network and regressor network.

In some embodiments, the training component adjusts parameters of the fusion model of the moment identification apparatus. For example, training data including training frames with ground-truth frame scores may be applied to the video component, which then generates predicted frame scores as described with reference to FIG. 4. Then, the predicted frame scores are input to the fusion model, which makes a final prediction as to whether a current time window contains a key moment or not. The training component can then compare the final prediction from the fusion model to the ground-truth frame scores of the training data, and perform a backpropagation over the layers of the fusion model to learn the fusion model. In some cases, the final prediction is number that represents the probability that the current time window contains a key moment.

In some embodiments, a mean-squared error (MSE) loss is used as the loss function used to train the fusion model. In some embodiments, the training component additionally uses an Adam optimizer during training. The training component may update parameters of the video component and the fusion model simultaneously, or may update the parameters for each part in separate phases. For example, in some training phases, the video component, the fusion component, or any parts thereof may be held fixed while remaining parameters are updated.

In some cases, the training data additionally includes labeled text data. The text data may be, for example, chat logs associated with the labeled video data described above. For example, the chat logs can be chat logs that are temporally aligned with the video data, or offset by a predetermined amount. The present disclosure is not limited thereto, however, and the labeled text data can be unrelated to the video data in some embodiments.

Text data within the training data includes a ground-truth label indicating whether or not the text (e.g., chat) occurred during a key moment. In an example, labeled video data and labeled text data are applied to the video component and the chat component, respectively, to generate frame scores and chat scores including sentiment scores.

At operation 915, the system combines the video data and text data to obtain multimodal features. For example, the system may combine the frame scores and the chat scores to obtain the multimodal features. In some cases, the operations of this step refer to, or may be performed by, a fusion model as described with reference to FIGS. 2 and 3. The fusion model then predicts a moment importance score that indicates whether or not a key moment has occurred within a time window of both the video data and the text data, and this prediction is compared with the ground truth labels described above.

At operation 920, the training component trains the machine learning model to identify key moments of the video data based on the video data based on the multimodal features and the ground-truth key moment data. The training component can then update parameters of the fusion model, the video component, the chat component, or a combination thereof based on the comparison. Additional modalities that can be used in training will now be described.

In some cases, the training data additionally includes labeled audio data. For example, the labeled audio data may include transcriptions with sentences that are labeled according to whether or not the sentence was stated during a key moment. In some cases, the labeling is on a sentence basis, but other embodiments may include transcriptions that are labeled on a word basis or a time window basis.

In a similar process to training with the video modality, the training component adjusts parameters of the audio component within the moment identification apparatus during a training phase. For example, the audio component may predict an audio score from the training data, and the training component will compare the prediction to the ground-truth score of the audio data (e.g., a labeled score for the word, sentence, or time window), and update parameters of the audio component based on the prediction. For example, an audio component may include an embedding block, such as Word2Vec, Doc2Vec, GloVe, or the like, and then a deep neural network proceeding the embedding block. In an example, the deep neural network includes an embedding layer to output a 300-dimensional feature vector, a convolutional 1D filter, a max pooling block, an LSTM, and a dense layer. The training component may update one or more of these sub-components during training of the audio component.

In some embodiments, the training component adjusts parameters of the fusion model of the moment identification apparatus using the audio training data. For example, training data including transcripts with ground-truth frame scores may be applied to the audio component, which then generates predicted audio scores. Then, the predicted audio scores are input to the fusion model, which makes a final prediction as to whether a current time window contains a key moment or not. The training component can then compare the final prediction from the fusion model to the ground-truth audio scores of the training data, and perform a backpropagation over the layers of the fusion model to learn the fusion model. In some cases, the final prediction is number that represents the probability that the current time window contains a key moment.

In some cases, the training data additionally includes labeled user behavior data. The training data may be based on past videos or past livestreams. In some embodiments, the training component samples frames included in the video training data as user behavior data to model user behavior. In other words, the training component may generate user behavior data by labeling a subset of the video frames. For example, the training component may sample approximately 15% of the ground-truth highlight frames from the video data, and label them as a positive response from the user. The remaining ground-truth highlight frames, as well as the ground-truth non-highlight frames, may be labeled as negative responses. In at least one embodiment, the frames are sampled from a Poisson distribution as described by Equation (4):

$$P(x) = \frac{0.6N * e^{-0.6}}{N!} \quad (4)$$

where N is the total number of highlight frames in the dataset. The sampling procedure is applied for each active user in a window to generate user behavior data. In some examples the average number of user clicks combined over all users is computed as the user behavior data, which is then sent to the fusion model. As described above, the fusion model can be trained end-to-end or piecewise, and with participation from the video component, the chat component, the audio component, and the user behavior component, or a subset thereof.

Figure 10:
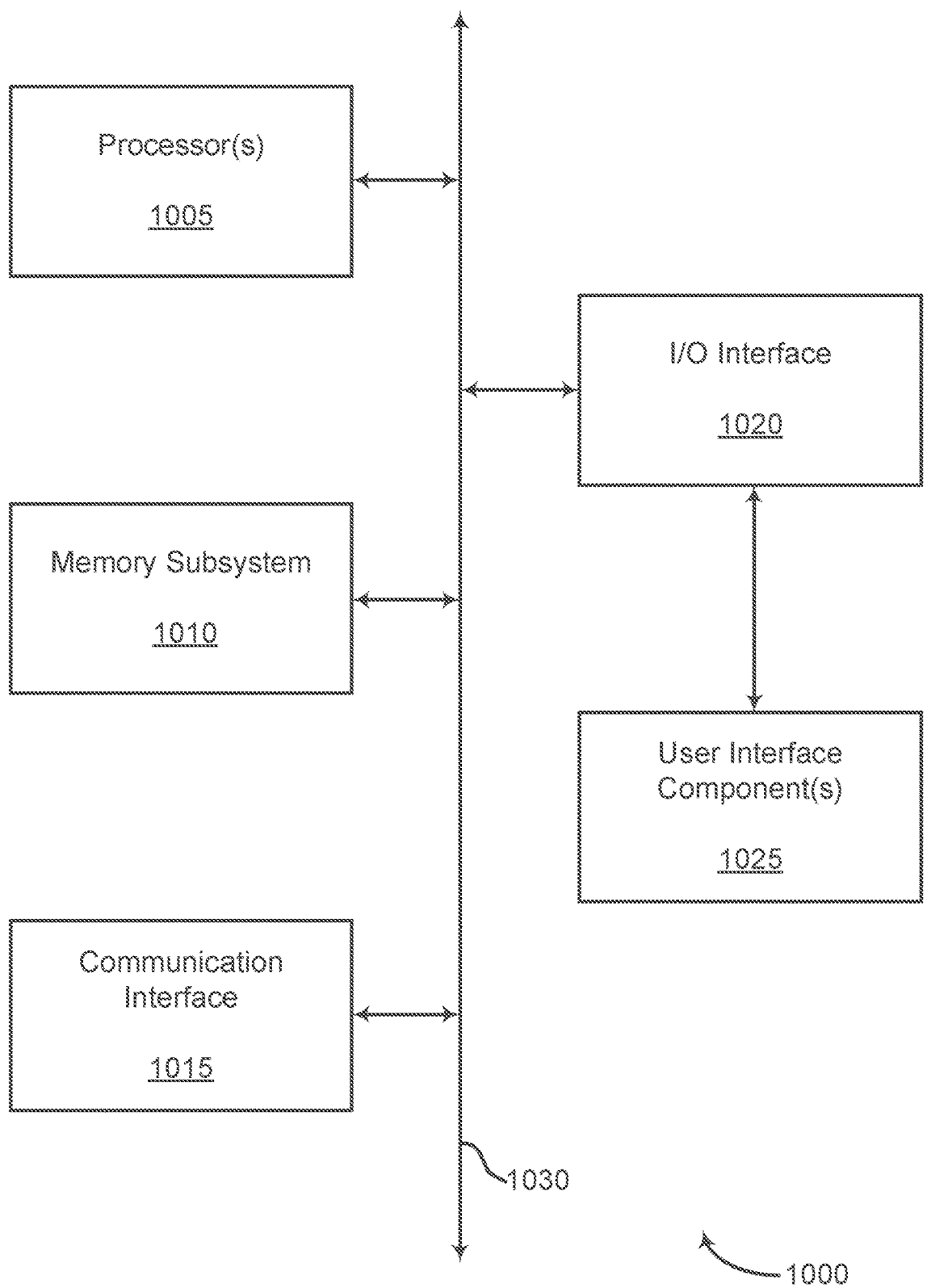
FIG. 10 shows an example of a computing device configured to identify key moments according to aspects of the present disclosure.

FIG. 10 shows an example of a computing device 1000 configured to identify key moments according to aspects of the present disclosure. The example shown includes computing device 1000, processor(s) 1005, memory subsystem 1010, communication interface 1015, I/O interface 1020, user interface component(s), and channel 1030.

In some embodiments, computing device 1000 is an example of, or includes aspects of, moment identification apparatus 100 of FIG. 1. In some embodiments, computing device 1000 includes one or more processors 1005 that can execute instructions stored in memory subsystem 1010 to obtain video data and text data, wherein the text data is aligned with a timeline of the video data; compute a moment importance score for a time of the video data using a machine learning model based on the video data and the text data; and present content to a user at the time of the video data based on the moment importance score.

According to some aspects, computing device 1000 includes one or more processors 1005. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1010 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1015 operates at a boundary between communicating entities (such as computing device 1000, one or more user devices, a cloud, and one or more databases) and channel 1030 and can record and process communications. In some cases, communication interface 1015 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1020 is controlled by an I/O controller to manage input and output signals for computing device 1000. In some cases, I/O interface 1020 manages peripherals not integrated into computing device 1000. In some cases, I/O interface 1020 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1020 or via hardware components controlled by the I/O controller.

According to some aspects, user interface component(s) 1025 enable a user to interact with computing device 1000. In some cases, user interface component(s) 1025 include an audio device, such as an external speaker system, an external display device such as a display screen, an input device (e.g., a remote control device interfaced with a user interface directly or through the I/O controller), or a combination thereof. In some cases, user interface component(s) 1025 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
   obtaining video data and chat log text, wherein the chat log text is aligned with a timeline of the video data;
   encoding the video data and the chat log text using a fusion encoder model to obtain a combined feature vector representing the video data and the chat log text;
   generating a moment importance score for a time of the video data by decoding the combined feature vector using a decoder of a machine learning model, wherein the moment importance score indicates a probability that the time of the video comprises a key moment; and
   presenting content to a user at the time of the video data based on the moment importance score.

2. The method of claim 1, further comprising:
   receiving the video data from a livestream; and
   presenting the content to the user in real time during the livestream.

3. The method of claim 1, wherein the presenting the content comprises:
   overlaying the content on the video data for a predetermined period of time.

4. The method of claim 1, further comprising:
   capturing the chat log text from a chat log associated with the video data.

5. The method of claim 1, further comprising:
   computing frame features for a frame of the video data using a video feature extraction network; and
   computing a frame score based on the frame features, wherein the moment importance score is based on the frame score.

6. The method of claim 1, further comprising:
   identifying a time window based on the time;
   selecting a portion of the chat log text based on the time window; and
   computing a text score based on the portion of the chat log text=, wherein the moment importance score is based on the text score.

7. The method of claim 6, wherein:
   the text score comprises a density score, a diversity score, a user score, a text sentiment score, an emoji sentiment score, or any combination thereof.

8. The method of claim 1, further comprising:
   concatenating a frame score from the video data and a text score from the chat log text to obtain the combined feature vector.

9. The method of claim 1, further comprising:
   obtaining audio data corresponding to the video data;
   identifying a time window based on the time;
   selecting a portion of the audio data; and
   computing an audio score based on the portion of the audio data, wherein the moment importance score is based on the audio score.

10. The method of claim 9, wherein:
    the audio data comprises a transcript of the video data.

11. The method of claim 1, further comprising:
    obtaining user behavior data corresponding to the video data;
    identifying a time window based on the time;
    selecting a portion of the user behavior data; and
    computing a user behavior score based on the portion of the user behavior data, wherein the moment importance score is based on the user behavior score.

12. An apparatus comprising:
    a processor;
    a memory including instructions executable by the processor to perform operations including:
    obtaining video data and chat log text, wherein chat log text is aligned with a timeline of the video data;
    encoding the video data and the chat log text using a fusion encoder model to obtain a combined feature vector representing the video data and the chat log text;
    generating a moment importance score for a time of the video data by decoding the combined feature vector using a decoder of a machine learning model, wherein the moment importance score indicates a probability that the time of the video comprises a key moment; and
    presenting content to a user at the time of the video data based on the moment importance score.

13. The apparatus of claim 12, wherein:
    the machine learning model comprises a recurrent neural network (RNN) configured to combine time series features for the video data and the text data to obtain multimodal features and to compute the moment importance score based on the multimodal features.

14. The apparatus of claim 12, wherein:
    the machine learning model comprises a video feature extraction network and a text encoder.

15. The apparatus of claim 12, wherein:
    the machine learning model comprises an audio encoder.

16. The apparatus of claim 12, wherein:
    the machine learning model comprises a user behavior encoder.

17. A non-transitory computer readable medium storing code for data processing, the code comprising instructions that, when executed by at least one processor, cause the at least one processor to perform operations comprising:
    obtaining video data and chat log text, wherein the chat log text is aligned with a timeline of the video data;
    encoding the video data and the chat log text using a fusion encoder model to obtain a combined feature vector representing the video data and the chat log text;

generating a moment importance score for a time of the video data by decoding the combined feature vector using a decoder of a machine learning model, wherein the moment importance score indicates a probability that the time of the video comprises a key moment; and presenting content to a user at the time of the video data based on the moment importance score.

18. The non-transitory computer readable medium of claim 17, the code further comprising instructions that, when executed by at least one processor, cause the at least one processor to perform operations comprising:

receiving the video data from a livestream; and presenting the content to the user in real time during the livestream.

19. The non-transitory computer readable medium of claim 17, wherein the presenting the content comprises:

overlaying the content on the video data for a predetermined period of time.

20. The non-transitory computer readable medium of claim 17, the code further comprising instructions that, when executed by at least one processor, cause the at least one processor to perform operations comprising:

capturing the chat log text from a chat log associated with the video data.

\* \* \* \* \*